United States Patent
Lecerf et al.

(10) Patent No.: US 10,781,679 B2
(45) Date of Patent: Sep. 22, 2020

(54) FRACTURES TREATMENT

(71) Applicant: SCHLUMBERGER TECHNOLOGY CORPORATION, Sugar Land, TX (US)

(72) Inventors: Bruno Lecerf, Houston, TX (US); Anastasia Evgenyevna Shalagina, Novosibirsk (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 15/524,882

(22) PCT Filed: Nov. 6, 2014

(86) PCT No.: PCT/RU2014/000838
§ 371 (c)(1),
(2) Date: May 5, 2017

(87) PCT Pub. No.: WO2016/072877
PCT Pub. Date: May 12, 2016

(65) Prior Publication Data
US 2017/0321112 A1  Nov. 9, 2017

(51) Int. Cl.
E21B 43/267 (2006.01)
C09K 8/80 (2006.01)
C09K 8/68 (2006.01)
C09K 8/82 (2006.01)
C09K 8/88 (2006.01)
C09K 8/64 (2006.01)

(52) U.S. Cl.
CPC .............. *E21B 43/267* (2013.01); *C09K 8/64* (2013.01); *C09K 8/68* (2013.01); *C09K 8/80* (2013.01); *C09K 8/82* (2013.01); *C09K 8/885* (2013.01); *C09K 2208/08* (2013.01)

(58) Field of Classification Search
None
See application file for complete search history.

(56) References Cited

U.S. PATENT DOCUMENTS

| | | |
|---|---|---|
| 3,850,247 A | 11/1974 | Tinsley |
| 4,406,850 A | 9/1983 | Hills |
| 5,082,720 A | 1/1992 | Hayes |
| 5,330,005 A | 7/1994 | Card et al. |
| 5,501,275 A | 3/1996 | Card et al. |

(Continued)

FOREIGN PATENT DOCUMENTS

| | | |
|---|---|---|
| RU | 2309971 C1 | 11/2007 |
| WO | 2004005671 A1 | 1/2004 |

(Continued)

OTHER PUBLICATIONS

Hager et al., "A revolutionary product concept: Silicone gum pellets as additives for thermoplastics", Society of Plastics Engineers International Conference on Polyolefins 2005: The Challenges of Globalization, vol. 2, 2005, pp. 604-613.

(Continued)

*Primary Examiner* — Andrew Sue-Ako

(57) ABSTRACT

A fracture treatment method includes forming propped regions having an optimized conductivity. Also disclosed are systems to treat a fracture interval and to produce reservoir fluids from a formation.

12 Claims, 4 Drawing Sheets

(56) References Cited

U.S. PATENT DOCUMENTS

| | | | |
|---|---|---|---|
| 5,518,996 A | 5/1996 | Maroy et al. | |
| 5,618,479 A | 4/1997 | Lijten et al. | |
| 5,905,468 A | 5/1999 | Ikawa et al. | |
| 6,419,019 B1 | 7/2002 | Palmer et al. | |
| 7,044,220 B2 | 5/2006 | Nguyen et al. | |
| 7,250,127 B2 | 7/2007 | Geck et al. | |
| 7,275,596 B2 | 10/2007 | Willberg et al. | |
| 7,281,581 B2 | 10/2007 | Nguyen et al. | |
| 7,325,608 B2 | 2/2008 | van Batenburg et al. | |
| 7,380,601 B2 | 6/2008 | Willberg et al. | |
| 7,581,590 B2 | 9/2009 | Lesko et al. | |
| 7,784,541 B2 | 8/2010 | Hartman et al. | |
| 7,789,146 B2 | 9/2010 | Panga et al. | |
| 7,833,950 B2 | 11/2010 | Willberg et al. | |
| 8,008,234 B2 | 8/2011 | Panga et al. | |
| 8,061,424 B2 | 11/2011 | Willberg et al. | |
| 8,066,068 B2 | 11/2011 | Lesko et al. | |
| 8,119,574 B2 | 2/2012 | Panga et al. | |
| 8,167,043 B2 | 5/2012 | Willberg et al. | |
| 8,210,249 B2 | 7/2012 | Panga et al. | |
| 8,227,026 B2 | 7/2012 | McDaniel et al. | |
| 8,230,925 B2 | 7/2012 | Willberg et al. | |
| 8,234,072 B2 | 7/2012 | Smith, Jr. et al. | |
| 8,372,787 B2 | 2/2013 | Droger | |
| 2002/0007169 A1 | 1/2002 | Graef et al. | |
| 2004/0228890 A1 | 11/2004 | Blin et al. | |
| 2008/0006413 A1 | 1/2008 | Le Gloahec et al. | |
| 2008/0070810 A1 | 3/2008 | Mang | |
| 2008/0135242 A1 | 6/2008 | Lesko et al. | |
| 2008/0196896 A1 | 8/2008 | Bustos et al. | |
| 2008/0236832 A1 | 10/2008 | Fu et al. | |
| 2010/0263870 A1 | 10/2010 | Willberg et al. | |
| 2010/0272994 A1 | 10/2010 | Carlson et al. | |
| 2010/0288495 A1 | 11/2010 | Willberg et al. | |
| 2010/0288500 A1 | 11/2010 | Carlson et al. | |
| 2010/0300688 A1 | 12/2010 | Panga et al. | |
| 2011/0098202 A1 | 4/2011 | James et al. | |
| 2011/0240293 A1 | 10/2011 | Lesko et al. | |
| 2012/0000641 A1 | 1/2012 | Panga et al. | |
| 2012/0048555 A1 | 3/2012 | Hughes et al. | |
| 2012/0067581 A1 | 3/2012 | Auzerais et al. | |
| 2012/0088699 A1* | 4/2012 | Qin | C09K 8/805 507/205 |
| 2012/0111563 A1 | 5/2012 | Abad et al. | |
| 2012/0129737 A1 | 5/2012 | Lesko et al. | |
| 2012/0132421 A1 | 5/2012 | Loiseau et al. | |
| 2012/0138296 A1 | 6/2012 | Panga et al. | |
| 2012/0305245 A1 | 12/2012 | Loiseau et al. | |
| 2012/0305254 A1 | 12/2012 | Chen et al. | |
| 2012/0325472 A1 | 12/2012 | Litvinets et al. | |
| 2013/0048285 A1* | 2/2013 | Boulard | C04B 28/02 166/293 |
| 2013/0066617 A1 | 3/2013 | Weng et al. | |
| 2013/0134088 A1 | 5/2013 | Dahringer et al. | |
| 2013/0233542 A1 | 9/2013 | Shampine et al. | |
| 2015/0060063 A1 | 3/2015 | Miller | |
| 2016/0215604 A1 | 7/2016 | Potapenko et al. | |
| 2017/0037305 A1 | 2/2017 | Shalagina et al. | |
| 2017/0037306 A1 | 2/2017 | Shalagina et al. | |
| 2017/0167222 A1* | 6/2017 | Lee | C09K 8/62 |

FOREIGN PATENT DOCUMENTS

| | | |
|---|---|---|
| WO | 2004037946 A1 | 5/2004 |
| WO | 2007086771 A1 | 8/2007 |
| WO | 2009005387 A1 | 1/2009 |
| WO | 2010075248 A1 | 7/2010 |
| WO | 2011050046 A1 | 4/2011 |
| WO | 2012054456 A1 | 4/2012 |
| WO | 2013085412 A1 | 6/2013 |
| WO | 2014039216 A1 | 3/2014 |

OTHER PUBLICATIONS

International Search Report and Written Opinion issued in International Patent Appl. No. PCT/RU2014/000838 dated Aug. 13, 2015; 7 pages.

Vasudevan et al., "Field Test of a Novel Low Viscosity Fracturing Fluid in the Lost Hills Fields, California", SPE 68854, SPE Western Regional Meeting, Bakersfield, California, Mar. 26-30, 2001, 11 pages.

Engels et al., "A Mechanical Methodology of Improved Proppant Transport in Low-Viscosity Fluids: Application of a Fiber-Assisted Transport Technique in East Texas", SPE 91434, 2004 SPE Eastern Regional Meeting, Charleston, West Virgina, Sep. 15-17, 2004, 11 pages.

International Search Report and Written Opinion issued in International Patent Application No. PCT/RU2014/000837 dated Mar. 5, 2015; 8 pages.

International Search Report issued in International Patent Application No. PCT/RU2014/000271 dated Jan. 22, 2015; 3 pages.

Written Opinion issued in International Patent Application No. PCT/RU2014/000271 dated Jan. 22, 2015; 4 pages.

\* cited by examiner

FRACTURES TREATMENT

RELATED APPLICATION DATA

None.

BACKGROUND

The statements in this section merely provide background information related to the present disclosure and may not constitute prior art.

Fracturing is used to increase permeability of subterranean formations. A fracturing fluid is injected into the wellbore passing through the subterranean formation. A propping agent (proppant) is injected into the fracture to maintain the distance between the fracture walls upon closure and, thereby, to provide hydraulic conductivity and improved extraction of extractive fluids, such as oil, gas or water.

Viscosified carrier fluids have widely been used for well stimulation; these fluids are typically based on aqueous fluids containing crosslinked polymers that enable the creation of wide fracture and transport of the proppant over long distances. Fibers have been used to further increase proppant transport by decreasing their settling rate. In order to improve conductivity, it is desirable that the fiber degrades over time.

Operationally, fibers always pose a challenge in terms of dispersibility in the aqueous fluid before crosslinking. Indeed, the fibers are mixed with the aqueous fluid and the proppant, the mixture pass the pump and is crosslinked thereafter before reaching the location to be fractured. If the fiber do not disperse quickly and uniformly, it causes huge challenges as fiber may form clumps which diminish their proppant transport ability, and clumps may create screen out when reaching the fracture. So far, the industry has overcome this by mixing the fiber and aqueous fluid thoroughly thus involving heavy equipment, and/or by delaying the crosslinker so that the fibers have more residence time within the aqueous fluid before viscosification, thus taking the risk of penetrating the fracture with a fluid not fully viscosified.

The industry would welcome fibers with improved dispersibility and reducing screen out risk by having a low or no bridging capacity.

SUMMARY

In some embodiments according to the disclosure herein, compositions, methods and systems using channelant are employed in viscosified treatment fluids to inhibit proppant settling while obtaining suitable resistance to bridging, e.g., without bridging in some embodiments and to have improve dispersibility.

The disclosed subject matter of the application in some embodiments provides methods and systems to treat subterranean formations penetrated by a wellbore using a compound cluster placement technique.

In embodiments, compositions comprising a viscosified carrier fluid, proppants and a polymeric channelant containing from 0.1 to 20 wt % of silicones are described.

In some embodiments, a well treatment fluid may comprise a viscosified carrier fluid, e.g., having a viscosity above 50 mPa-s at a shear rate of 170 s-1 and a temperature of 25° C., proppant dispersed in the carrier fluid, and fiber dispersed in the carrier fluid.

In some embodiments according to the present disclosure, a method to treat a subterranean formation penetrated by a wellbore comprises formulating a treatment fluid stage comprising alternating solid particulate-rich and solid particulate-lean substages; injecting the formulated treatment fluid stage above a fracturing pressure into the formation by alternatingly injecting the solid particulate-rich and solid particulate-lean substages into the fracture; forming a plurality of particulate-rich island regions; and hydraulically conducting fluid flow through the open channel regions between the formation and the wellbore.

In some embodiments, the method may further comprise channelizing the solid particulate rich island regions in situ in the fracture to form solid particulate clusters within the island regions separated from adjacent solid particulate clusters by open voids within the island regions. In some embodiments, the solid particulate-rich substages and the solid particulate-lean substages in the treatment stage fluid may have an overall volumetric ratio from 60:40 to 95:5, or from 70:30 to 90:10.

In some embodiments according to the present disclosure, a method comprises injecting a treatment fluid stage above a fracturing pressure into the formation to distribute a mixture of a solid particulate in a fracture; alternatingly injecting solid particulate-rich and solid particulate-lean substages of the treatment fluid stage into the fracture to form a plurality of solid particulate-rich island regions in the fracture and an interconnected network of open channel regions between the island regions; channelizing the particulate-rich island regions in situ in the fracture to form particulate clusters within the island regions separated from adjacent particulate clusters by open voids in the island regions; reducing pressure in the fracture to close the fracture onto the island regions; and hydraulically conducting fluid flow through the open channel regions between the formation and the wellbore.

In some embodiments, the solid particulate-rich substages each comprise alternating pulses injected at different rates. In some embodiments, the solid particulate-rich substages may each comprise alternating pulses comprising a substantially uniform distribution of one or more components in the alternate pulses and a heterogeneous distribution between alternate pulses of at least one other component, e.g., another component selected from the solid particulate, fibers, anchorant, agglomerant, agglomerant aid, agglomerant aid activator, binding liquid, breaker, decrosslinker, fluid viscosity reducing agent, an induced settling trigger, viscous gel macrostructures, and combinations thereof.

In some embodiments, the treatment fluid stage comprises a carrying fluid. In some embodiments, the treatment fluid stage comprises an oil-in-water emulsion comprising a hydrophobic liquid dispersed in an aqueous carrying fluid. In some embodiments, the treatment fluid stage comprises a viscoelastic surfactant in a carrying fluid. In some embodiments, the treatment fluid stage comprises a pH control agent. In some embodiments, the treatment fluid stage comprises an ester and further comprising releasing an acid from the ester. In some embodiments the treatment fluid stage comprises an encapsulated breaker.

In some embodiments, the solid particulate-lean substages comprise fiber. In some embodiments, the solid particulate-rich substages comprise a slurry of the solid particulate freely dispersed in fluid spaces around macrostructures suspended in a carrying fluid.

In some embodiments, the solid particulate-rich substages provide at least a minimum coverage of propped regions comprising the islands and a channel breadth between the propped regions sufficiently small to inhibit collapse of the open channel regions in the interconnected network, e.g., a propped region:open channel region area ratio from 60:40 to 95:5, or from 70:30 to 90:10.

In some embodiments according to the present disclosure, a system to produce reservoir fluids comprises a subterranean formation penetrated by a wellbore; a fracture in fluid communication between the formation and the wellbore through a network of open channels between a plurality of propped regions; the propped regions providing coverage greater than coverage of the open channels, and the open channels having a breadth to inhibit collapse of the open channels between the propped regions; the propped regions each comprising a plurality of proppant clusters separated by open voids between the propped clusters in the respective propped region.

In some embodiments according to the present disclosure, a system to treat a fracture interval of a formation penetrated by a wellbore comprises: a subterranean formation penetrated by a wellbore; a treatment fluid stage disposed at least partially in the wellbore, the treatment fluid stage comprising solid particulate-rich and solid particulate-lean substages to form a plurality of solid particulate-rich island regions in the fracture and an interconnected network of open channel regions between the island regions; the solid particulate-rich substages each comprising alternating pulses comprising a substantially uniform distribution of one or more components in the alternate pulses and a heterogeneous distribution between alternate pulses of at least one other component to channelize the particulate-rich island regions in situ in the fracture to form particulate clusters within the island regions separated from adjacent particulate clusters by open voids within the island regions; a pump system to inject the treatment fluid stage from the wellbore to the formation at a pressure above fracturing pressure to inject the treatment fluid stage into a fracture in the formation; and a shut in system to close the fracture onto the solid particulate-rich island regions.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

These and other features and advantages will be better understood by reference to the following detailed description when considered in conjunction with the accompanying drawings.

DETAILED DESCRIPTION OF SOME ILLUSTRATIVE EMBODIMENTS

Figure 1:
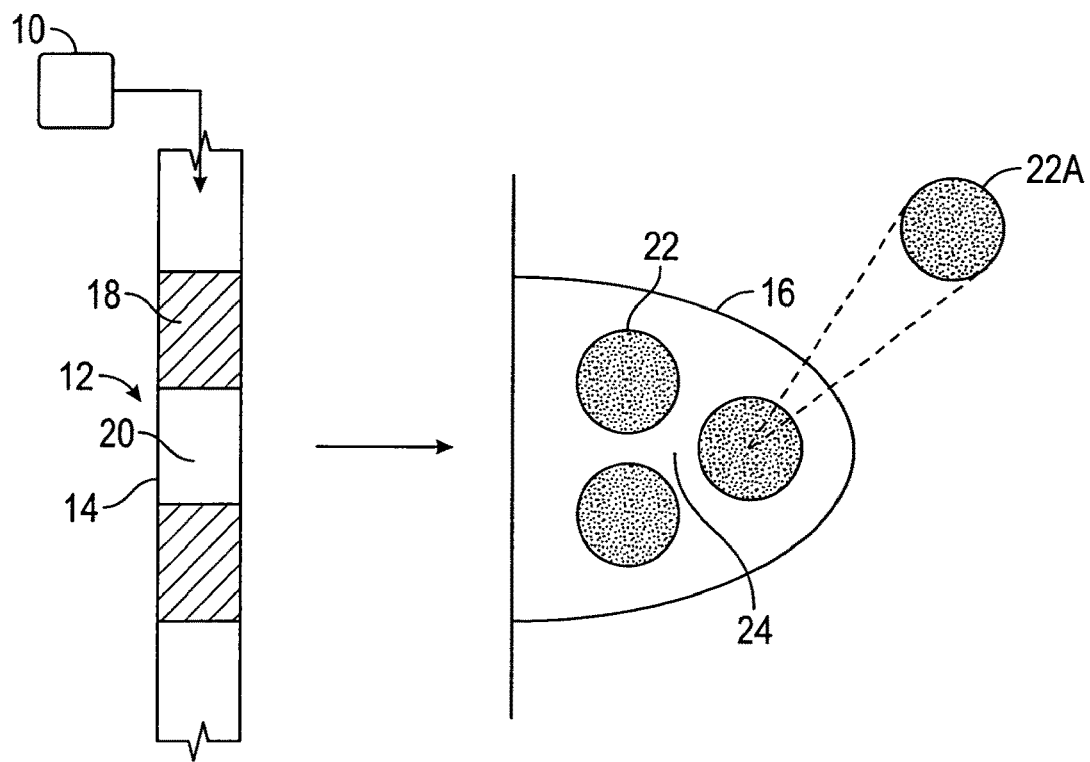
FIG. 1 schematically illustrates a fracture filled with alternating stages of homogenous proppant-rich and proppant-lean treatment fluids.

For the purposes of promoting an understanding of the principles of the disclosure, reference will now be made to some illustrative embodiments of the current application. Like reference numerals used herein refer to like parts in the various drawings. Reference numerals without suffixed letters refer to the part(s) in general; reference numerals with suffixed letters refer to a specific one of the parts.

As used herein, "embodiments" refers to non-limiting examples of the application disclosed herein, whether claimed or not, which may be employed or present alone or in any combination or permutation with one or more other embodiments. Each embodiment disclosed herein should be regarded both as an added feature to be used with one or more other embodiments, as well as an alternative to be used separately or in lieu of one or more other embodiments. It should be understood that no limitation of the scope of the claimed subject matter is thereby intended, any alterations and further modifications in the illustrated embodiments, and any further applications of the principles of the application as illustrated therein as would normally occur to one skilled in the art to which the disclosure relates are contemplated herein.

Moreover, the schematic illustrations and descriptions provided herein are understood to be examples only, and components and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

It should be understood that, although a substantial portion of the following detailed description may be provided in the context of oilfield hydraulic fracturing operations, other oilfield operations such as cementing, gravel packing, etc., or even non-oilfield well treatment operations, can utilize and benefit as well from the instant disclosure.

In some embodiments according to the disclosure herein, an in situ method and system are provided for increasing fracture conductivity. By "in situ" is meant that channels of relatively high hydraulic conductivity are formed between particulate clusters in a fracture after at least a portion of the fracture has been filled with a generally continuous proppant or other particle concentration or regions of continuous proppant concentration. The following discussion refers to proppant as one example of the first solid particle which may be used in the present disclosure, although other types of solid particles are contemplated. The terms proppant and sand are used interchangeably herein.

As used herein, a "hydraulically conductive fracture" is one which has a high conductivity relative to the adjacent formation matrix, whereas the term "conductive channel" refers to both open channels as well as channels filled with a matrix having interstitial spaces for permeation of fluids through the channel, such that the channel has a relatively higher conductivity than adjacent non-channel areas.

As used herein, "compound cluster placement" refers to a fracture system comprising proppant islands spaced apart by open channels wherein the proppant islands are each comprised of a plurality of proppant clusters, each proppant cluster comprising a plurality of proppant particles in contact with adjacent particles, wherein the spacing between the proppant clusters within a proppant island is much less than the spacing between adjacent proppant islands, e.g., an order of magnitude less. Proppant clusters may or may not be porous, e.g., they may have a packed volume fraction from 50 to 100% with interstitial flow paths on the order of the largest particle size, whereas proppant islands in a compound cluster placement system may each comprise a plurality of clusters with intermediate sized flow channels between the clusters, which are generally smaller than the relatively larger open flow channels between the islands.

Proppant coverage refers to the area of a fracture along its extent which contains the proppant islands or other propped regions in relation to the total area of the extent of the fracture. Because of the close proximity of the clusters within the islands relative to the stiffness and closure stress, the entire area of the island may be considered to be propped. The "channel breadth" refers to the distance between the propped regions. Modeling tools such as FracCADE are available from Schlumberger to determine, based on the closure stress, e.g., the overburden pressure, and the stiffness or rigidity of the formation at the fracture face, the maximum channel breadth that can be tolerated before the fracture will collapse and opposing faces of the fracture between the adjacent islands will be closed off. Conventional modeling tools such as MATLAB may also be used by a person skilled in the art. In some embodiments, the treatment is designed to avoid collapse of the channels, or to minimize risk of collapse, by providing open channels between the proppant islands which generally do not exceed the maximum allowable open channel breadth for the particular fracture closure stress and stiffness.

The term considering closure stress and stiffness of an interval of the formation may encompass both: estimating or measuring such closure stress and stiffness.

The term "continuous" in reference to concentration or other parameter as a function of another variable such as time, for example, means that the concentration or other parameter is an uninterrupted or unbroken function, which may include relatively smooth increases and/or decreases with time, e.g., a smooth rate or concentration of proppant particle introduction into a fracture such that the distribution of the proppant particles is free of repeated discontinuities and/or heterogeneities over the extent of proppant particle filling. In some embodiments, a relatively small step change in a function is considered to be continuous where the change is within +/−10% of the initial function value, or within +/−5% of the initial function value, or within +/−2% of the initial function value, or within +/−1% of the initial function value, or the like over a period of time of 1 minute, 10 seconds, 1 second, or 1 millisecond. The term "repeated" herein refers to an event which occurs more than once in a stage.

Conversely, a parameter as a function of another variable such as time or rate, for example, is "discontinuous" wherever it is not continuous, and in some embodiments, a repeated relatively large step function change is considered to be discontinuous, e.g., where the lower one of the parameter values before and after the step change is less than 80%, or less than 50%, or less than 20%, or less than 10%, or less than 5%, or less than 2% or less than 1%, of the higher one of the parameter values before and after the step change over a period of time of 1 minute, 10 seconds, 1 second, or 1 millisecond.

In embodiments, the open voids between the clusters within the proppant islands may be formed in situ after placement of the proppant islands in the fracture by differential movement of the proppant particles, e.g., by coalescence of the binding liquid around the agglomerant and/or proppant particles, by gravitational settling and/or fluid movement such as fluid flow initiated by a flowback operation, out of and/or away from an area(s) corresponding to the conductive channel(s) and into or toward spaced-apart areas in which clustering of the proppant particles results in the formation of relatively less conductive areas, which clusters may correspond to pillars between opposing fracture faces upon closure. In embodiments, the movement of the proppant particles may be facilitated by the presence or introduction of an agglomerant aid such as a binding liquid, e.g., a hydrophobic liquid In embodiments; and the movement of the proppant particles may optionally be further facilitated by reduction of the viscosity of the treatment fluid, which may be instantaneous, gradual, or stagewise.

According to some embodiments herein, the open voids between the clusters within the proppant islands may be formed by injecting a treatment stage fluid, comprising a slurry of a solid particulate freely dispersed in fluid spaces around macrostructures suspended in a carrier fluid, into the fracture and aggregating the solid particulate in the fracture to form clusters at respective interfaces with adjacent macrostructures. According to some embodiments, the solid particulate comprises disaggregated proppant in a proppant-laden substage or pulse within the substage. According to some embodiments, the carrier fluid comprises fiber present in the fluid spaces around the macrostructures, e.g., gel balls, to stabilize the treatment stage fluid for the injection into the fracture.

In some embodiments, the method comprises pumping a proppant laden fracturing fluid into a subterranean formation at pressure above a fracturing pressure of the formation. As apparent from FIG. 1, a pumping system 10 supplies a treatment fluid 12 to wellbore 14 in communication with a fracture 16. In this system the treatment fluid stage comprises alternating proppant-laden substages 18 with a proppant-lean substage 20, which form proppant islands 22 in the fracture 16 corresponding to the proppant-laden substages 18 and channels 24 between the islands corresponding to the proppant-lean substages 20.

During the injection of the fracturing fluid, the pressure in the well or treatment zone thereof may be sufficiently maintained to keep the fracture 16 from closing before the islands 22 and channels 24 are formed, following which the fracture is closed on the proppant islands 22, which theoretically maintain the spacing between the opposing fracture faces for hydraulic conductivity. In this system, the channels 24 are relatively wide in an effort to improve conductivity since the proppant islands 22 generally have a uniform proppant distribution with matrix-like flow conductivity, i.e., fluid must flow between the interstices of the adjacent proppant particles as seen in the enlarged island are 22A. To provide wide channels 24, a relatively greater total volume of the proppant-lean substages 20 is employed relative to that of the proppant-laden substages 22.

It should be noted when considering the relative volumes or other properties of the proppant-laden substages 18 relative to the proppant-lean substages 20, one generally refers only to the main substages, that is, any preceding pad or pre-pad stages as well as any following flush stages are not generally considered as being either a proppant-laden substage 18 or a proppant-lean substage 20 and may be excluded from the calculation. For example, the initial proppant-laden substage 18 is considered relative to the initial trailing proppant-lean substage 20, whereas the ultimate proppant-laden substage 18 may be considered relative to the immediately preceding proppant-lean substage 20, and the intermediate proppant-laden substages 18 may be considered relative to either the immediately preceding or immediately following proppant-lean substage 20.

When a pre-pad, a pad, a flush or a tail is used, they may be so called low viscosity, i.e. with a viscosity less than 50 mPa-s at a shear rate of 170 s-1 and a temperature of 25° C. In embodiments, the pre-pad, pad, flush tail or all may also contain some channelant. In embodiment, the pre-pad, pad, flush tail or all contain silicones modified fibers.

Figure 2:
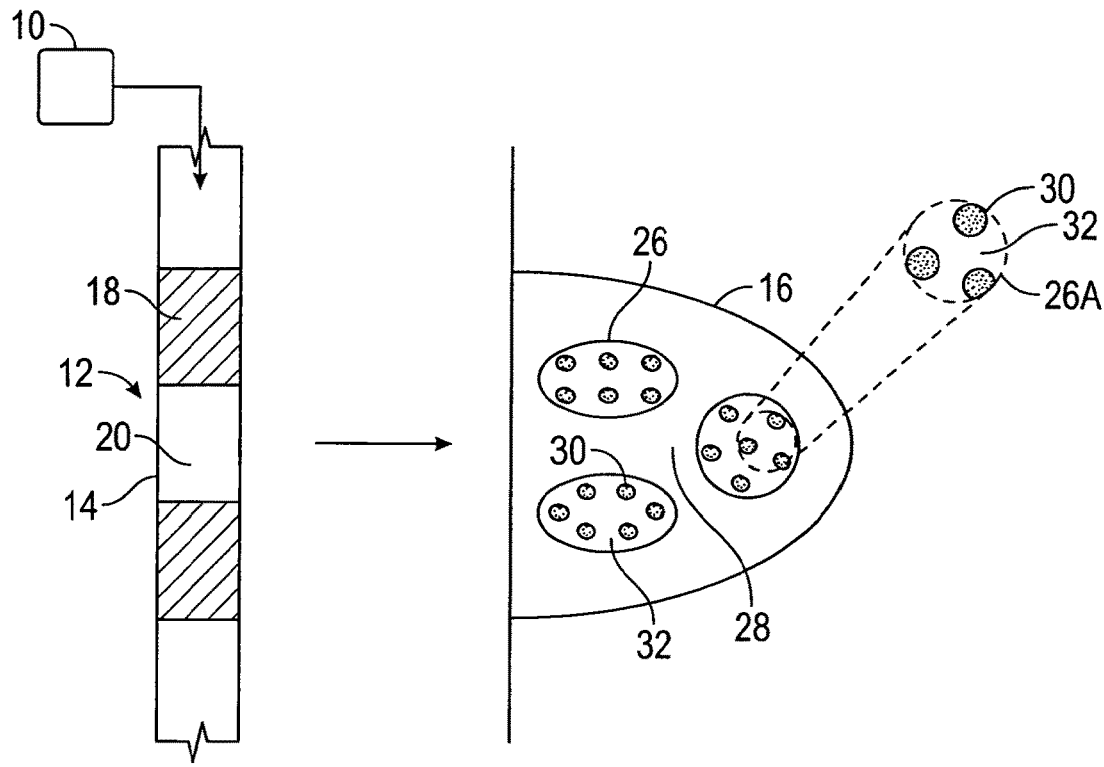
FIG. 2 schematically illustrates a fracture filled with alternating stages of in situ channelizing proppant-rich treatment fluid and proppant-lean treatment fluid, wherein the volume of the proppant rich treatment fluid similar to that of the proppant lean treatment fluid.

In some embodiments according to the present disclosure as seen in FIG. 2, the volume of the proppant-laden substages 18 is as large as or larger than that of the adjacent proppant-lean substages 20, which results in a proportionately larger proppant coverage by the proppant islands 26 in the fracture 16. The open channels 28 between the islands 26 in some embodiments do not exceed the maximum allowable channel breadth to inhibit collapse of the fracture, while at the same time providing improved fracture propping capability, e.g., a relatively wider fracture, due to the higher propped region coverage, depending on the closure stress and strength of the fracture rock. That is to say, the open channels may have a narrow breadth relative to FIG. 1, but may also have a greater width to maintain equivalent or improved conductivity, in some embodiments.

Larger in the present context means representing more than 50% of the volume, e.g. the proppant-laden substages represent more than 50% of the total volume of substages.

Adjacent may be interpreted as immediately preceding or following.

In addition, in some embodiments the islands 26 in FIG. 2 may be comprised of a plurality of proppant clusters 30 and open voids 32 to provide additional hydraulic conductivity through the islands 26. In some embodiments, these proppant clusters may be formed within the islands 26 by employing proppant-laden substages 18 which have an in-situ channelization functionality, e.g., a pulsed rate or concentration of proppant or other component such that clusters 30 of the proppant are formed within the islands 26. For example, the proppant-laden substages 18 placed in the fracture 16 may include, activate, generate or release a trigger that induces channelization; may be pulsed at different rates to induce clustering of the proppant within the islands 26; may contain alternating pulses comprising a substantially uniform distribution of one or more components in the alternate pulses and a heterogeneous distribution between alternate pulses of at least one other component, e.g., another component, the channelant, selected from the solid particulate, fibers, anchorant, agglomerant, agglomerant aid, agglomerant aid activator, binding liquid, an induced settling trigger, viscous gel macrostructures, and combinations thereof; or the like.

Figure 3:
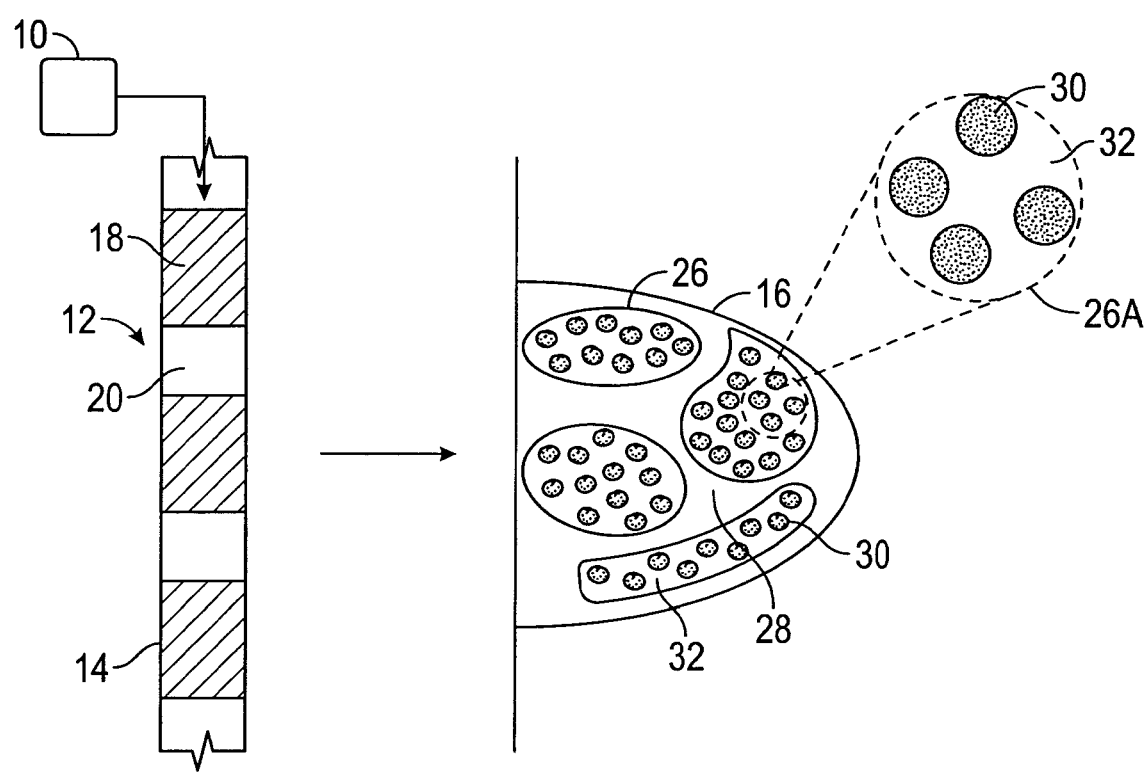
FIG. 3 schematically illustrates a fracture filled with alternating stages of in situ channelizing proppant-rich treatment fluid and proppant-lean treatment fluid, wherein the volume of the proppant rich treatment fluid is substantially greater than that of the proppant lean treatment fluid, according to embodiments of the present disclosure.

For some embodiments represented by FIG. 3, the volume of the proppant-laden substages 18 is substantially larger than that of the adjacent proppant-lean substages 20, which results in a substantially larger proppant coverage by the proppant islands 26 in the fracture 16. For example, solid particulate-rich substages 18 and the solid particulate-lean substages 20 may have an overall volumetric ratio from 60:40 to 95:5, or from 70:30 to 90:10, or the like, e.g., 80:20. Or, the relative volumes of the proppant-laden substages 18 and proppant-lean substages 20 may be such that the ratio of the proppant coverage (area of the islands 26) to that of the channels 28 is from 60:40 to 95:5, or from 70:30 to 90:10, or the like, e.g., 80:20.

In some embodiments, the movement of proppant into clusters 30 may optionally be facilitated, e.g., by activation of a trigger to destabilize the proppant-laden substages 18 of the fracturing fluid and/or the regions of the proppant islands 26, such as, for example, a breaker or decrosslinking additive to at least partially reduce the localized viscosity of the fracturing fluid, e.g., from a viscosity corresponding to a crosslinked polymer to that of a linear polymer. Channellants such as fibers may optionally also settle in the fracture, e.g., at a slower rate than the proppant, which may result in some embodiments from the Channellants having a specific gravity that is equal to or closer to that of the carrier fluid than that of the proppant. As one non-limiting example, the proppant may be sand with a specific gravity of 2.65, the Channellants may be a localized fiber-laden region comprising fiber with a specific gravity of 1.1-1.5, e.g., polylactic acid fibers having a specific gravity of 1.25, and the carrier fluid may be aqueous with a specific gravity of 1-1.1.

In some embodiments settling of the proppant may also be mediated by buoyancy imparted by a binding liquid and/or fibers, which may have a specific gravity lower than that of the proppant, carrier liquid or other component. In this example, the lower specific gravity component may have a lower settling rate relative to the proppant. In other embodiments, agglomerants and/or anchorants and/or channelants may interact with either or both of the fracture faces, e.g. by friction or adhesion, which may similarly be mediated by the presence of any binding liquid in some embodiments, e.g., where the binding liquid has an affinity for the formation surface, and may have a density similar or dissimilar to that of the proppant, e.g., glass fibers may have a specific gravity greater than 2.

As a result of coalescence induced by differential settling rates in the carrying fluid according to some embodiments, the proppant may form clusters adjacent respective agglomerants, facilitated by the presence of any binding liquid, and settling is retarded. Further, in some embodiments, the agglomerants may be channelants which are activated to form immobilized anchoring structures, which may be mediated by any binding liquid, to hold the clusters fast against the opposing surface(s) of the fracture.

In some embodiments, the method decreases the viscosity in the proppant-laden substages 18 of the fracturing fluid and/or the regions of the proppant islands 26 by employing a fracturing fluid comprising a crosslinked polymeric viscosifier for proppant placement, in one temporal stage to that of a linear gel, to promote proppant/agglomerant/binding liquid agglomeration for in-situ channelization, but without completely breaking the viscosity to facilitate anchoring prior to fracture closure, i.e., the formation or activation of anchors to inhibit complete settling of the proppant system to the floor of the fracture or proppant island.

The in-situ channelization concept is based on the creation of clusters, which in some embodiments may be anchored in the fracture within the proppant islands, to promote open voids within the islands. Anchors are materials designed to stay in place in the fracture, while clusters are the agglomeration of sand and any fiber, binding liquid or other materials that settle on top of the anchors after placement but before fracture closure. To initiate settling of the sand within the islands, a decrease in the fluid viscosity is implemented in some embodiments. In some embodiments, an acid or acid precursor may function as a decrosslinker which may be mixed homogenously in the treatment fluid or the proppant-laden substages 18 thereof at the surface, or pulsed into the proppant-laden substages 18, and pumped down the wellbore and into the fracture. After placement, the de-crosslinker, which in some embodiments may be based on ester chemistry to release the acid by hydrolysis, is allowed to react with the crosslinked polymer to reduce its viscosity. After fracture closure, a breaker such as an oxidative breaker may break and/or, in the case of a partially broken or decrosslinked viscosifier, continue to more fully break the viscosifier to facilitate cleanup and reservoir production.

In-situ channelization in some embodiments promotes high conductivity through proppant islands 26 by the formation of open void spaces 32, relying on the settlement of the proppant and fibers on the anchors to form clusters, leaving high conductive void spaces 32 within the proppant islands 26 that are free of proppant surrounding the clusters 30. The rate of settlement of the proppant is related to the creation of clusters 30, where a high settling rate can lead to no anchors or clusters, whereas a slow settling rate can lead to no open voids 32 due to premature fracture closure. The settlement of the sand depends on the viscosity of the fluid, and also, according to embodiments herein, on the rate at which this viscosity decreases at the reservoir temperature.

In one representative example according to some embodiments, a gelling agent is guar based, crosslinked with borate or with a delayed crosslinker and the oil-in-water emulsion employs alkaline emulsifiers for stability, which may be destabilized by reducing the pH. In some embodiments, the crosslinkers are used to create highly viscous gels comprising a stable oil-in-water emulsion at a pH between 8 and 12. In some embodiments, esters are used as dual functionality demulsifiers and decrosslinkers, since at high reservoir temperatures some esters can undergo hydrolysis and form carboxylic acids, lowering the pH of the fluid and thus destabilizing the emulsion to release the oil phase while simultaneously deactivating the borate or other crosslinker and thereby decrosslinking the fluid to improve mobility of the agglomerants, anchorants, channelization aids and/or proppants.

A system used to implement the fracture treatment may include a pump system comprising one or more pumps to supply the treatment fluid to the wellbore and fracture. In embodiments, the wellbore may include a substantially horizontal portion, which may be cased or completed open hole, wherein the fracture is transversely or longitudinally oriented and thus generally vertical or sloped with respect to horizontal. A mixing station in some embodiments may be provided at the surface to supply a mixture of carrier fluid, proppant, channelant, agglomerant aid, agglomerant aid activator, viscosifier, decrosslinking agent, etc., which may for example be an optionally stabilized concentrated blend slurry (CBS) to allow reliable control of the proppant concentration, any fiber, agglomerant aid, etc., which may for example be a concentrated masterbatch to allow reliable control of the concentration of the fiber, proppant, agglomerant aid, etc., and any other additives which may be supplied in any order, such as, for example, other viscosifiers, loss control agents, friction reducers, clay stabilizers, biocides, crosslinkers, breakers, breaker aids, corrosion inhibitors, and/or proppant flowback control additives, or the like.

In some embodiments, concentrations of one or more additives, including the proppants, fibers, agglomerant aid, or the like, to the fracturing fluid may be alternated. For example channelant/agglomerant aids may be alternatingly added, or a higher channelant/agglomerant aid concentration may be added, to form slugs of treatment fluid in which agglomeration and/or settling is promoted or inhibited, which may accumulate clusters during channelization, but which may be completely degraded after fracture closure to widen open voids or form additional open voids. Two or more additives (including channelants and/or agglomerant aids) may also be alternated independently in pulses within the proppant-laden substages.

The well may if desired also be provided with a shut in valve to maintain pressure in the wellbore and fracture, a flow-back/production line to flow back or produce fluids either during or post-treatment, as well as any conventional wellhead equipment.

If desired in some embodiments, the pumping schedule for the proppant-laden substages may be employed according to the alternating-proppant loading technology disclosed in U.S. Patent Application Publication No. US 2008/0135242, which is hereby incorporated herein by reference in its entirety.

In some embodiments, a treatment slurry stage, e.g., the proppant-laden substages thereof, has a continuous concentration of a first solid particulate, e.g., proppant, and a discontinuous concentration of an additive that facilitates either clustering of the first solid particulate in the islands, or anchoring of the clusters in the islands, or a combination thereof, to form clusters of the first solid particulate to prop open the fracture upon closure. As used herein, "channelant" refers to a material, a precursor material, or a mechanism, that inhibits movement such as settling, or preferably stops movement, of particulates or clusters of particulates in a fracture, whereas an "anchor" refers to an anchorant that is active or activated to inhibit or stop the movement. In some embodiments, the channelant may be an anchor that may comprise a material, such as fibers, flocs, flakes, discs, rods, stars, etc., for example, which may be heterogeneously distributed in the island regions of the fracture and have a different movement rate, and/or cause some of the first solid particulate to have a different movement rate, which may be faster or preferably slower with respect to the settling of the first solid particulate and/or clusters. As used herein, the term "flocs" includes both flocculated colloids and colloids capable of forming flocs in the treatment slurry stage.

In some embodiments, the channelant/anchorant may adhere to one or both opposing surfaces of the fracture to stop movement of a proppant particle cluster and/or to provide immobilized structures upon which proppant or proppant cluster(s) may accumulate. In some embodiments, the agglomerants/anchors may adhere to each other to facilitate consolidation, stability and/or strength of the formed clusters, which adherence may be mediated by the presence or generation of any binding liquid. Adherence of the agglomerants to each other and/or to the fracture surface may be promoted by a binding liquid in some embodiments.

In some embodiments, the channelant may comprise a continuous concentration of a first channelant component and a discontinuous concentration of a second channelant component, e.g., where the first and second channelant components may react or combine to form the anchor as in a fiber/binding liquid system, a two-reactant system, a catalyst/reactant system, a pH-sensitive reactant/pH modifier system (which may be or include the decrosslinker), or the like.

In some embodiments, the channelant may form boundaries for particulate movement, e.g., lower boundaries for particulate settling.

In some embodiments, the conductive channels extend in fluid communication from adjacent a face of the formation away from the wellbore to or to near the wellbore, e.g., to facilitate the passage of fluid between the wellbore and the formation, such as in the production of reservoir fluids and/or the injection of fluids into the formation matrix. As used herein, "near the wellbore" refers to conductive channels coextensive along a majority of a length of the fracture terminating at a permeable matrix between the conductive channels and the wellbore, e.g., where the region of the fracture adjacent the wellbore is filled with a permeable solids pack as in a high conductive proppant tail-in stage, gravel packing or the like.

In some embodiments, the proppant islands are channelized by injecting into a fracture in the formation at a continuous rate the proppant-laden substage with a continuous first solid particulate concentration; and while maintaining the continuous rate and first solid particle concentration during injection of the proppant-laden substage, successively alternating concentration modes of an channelant, such as fiber, in pulses between a plurality of relatively channelant-rich modes and a plurality of channelant-lean modes within the injected treatment fluid stage.

In some embodiments, the injection of the proppant-laden substages forms a homogenous region within the proppant islands of continuously uniform distribution of the first solid particulate. In some embodiments, the alternation of pulses of the concentration of the channelant and/or agglomerant aid forms heterogeneous areas within the proppant islands comprising channelant/agglomerant aid-rich areas and channelant/agglomerant aid-lean areas.

In some embodiments, the channellant is a fiber and the treatment fluid comprises from 0.48 to 12 g/L of the fibers based on the total volume of the carrier fluid (from 4 to 100 ppt, pounds per thousand gallons of carrier fluid), e.g., from 1.2 (10 ppt) to less than 4.8 g/L of the fibers based on the total volume of the carrier fluid (less than 40 ppt) or from 1.2 or 2.4 to 4.8 g/L of the fibers based on the total volume of the carrier fluid (from 10 or 20 to 40 ppt).

In some embodiments, the fibers are crimped staple fibers. In some embodiments, the crimped fibers comprise from 1 to 10 crimps/cm of length, a crimp angle from 45 to 160 degrees, an average extended length of fiber of from 4 to 15 mm, and/or a mean diameter of from 6 to 40 microns, or 6 to 12, or 6 to 10, or a combination thereof. In some embodiments, the fibers comprise low crimping equal to or less than 5 crimps/cm of fiber length, e.g., 1-5 crimps/cm.

Depending on the temperature that the treatment fluid will encounter, especially at downhole conditions, the fibers may be chosen depending on their resistance or degradability at the envisaged temperature. In the present disclosure, the terms "low temperature fibers", "mid temperature fibers" and "high temperature fibers" may be used to indicate the temperatures at which the fibers may be used for delayed degradation, e.g., by hydrolysis, at downhole conditions. Low temperatures are typically within the range of from about 60° C. (140° F.) to about 93° C. (200° F.); mid temperatures typically from about 94° C. (201° F.) to about 149° C. (300° F.); and high temperatures typically about 149.5° C. (301° F.) and above, or from about 149.5° C. (301° F.) to about 204° C. (400° F.).

In some embodiments, the fibers comprise polyester. In some embodiments, the polyester undergoes hydrolysis at a low temperature of less than about 93° C. as determined by slowly heating 10 g of the fibers in 1 L deionized water until the pH of the water is less than 3, and in some embodiments, the polyester undergoes hydrolysis at a moderate temperature of between about 93° C. and 149° C. as determined by slowly heating 10 g of the fibers in 1 L deionized water until the pH of the water is less than 3, and in some embodiments, the polyester undergoes hydrolysis at a high temperature greater than 149° C., e.g., between about 149.5° C. and 204° C. In some embodiments, the polyester is selected from the group consisting of polylactic acid, polyglycolic acid, copolymers of lactic and glycolic acid, and combinations thereof.

In some embodiments, the fiber is selected from the group consisting of polylactic acid (PLA), polyglycolic acid (PGA), polyethylene terephthalate (PET), polyester, polyamide, polycaprolactam and polylactone, poly(butylene) succinate, polydioxanone, nylon, glass, ceramics, carbon (including carbon-based compounds), elements in metallic form, metal alloys, wool, basalt, acrylic, polyethylene, polypropylene, novoloid resin, polyphenylene sulfide, polyvinyl chloride, polyvinylidene chloride, polyurethane, polyvinyl alcohol, polybenzimidazole, polyhydroquinone-diimidazopyridine, poly(p-phenylene-2,6-benzobisoxazole), rayon, cotton, cellulose and other natural fibers, rubber, and combinations thereof.

Any type of PLA might be used. In embodiments, when PLA is used, said PLA may be poly-D, poly-L, poly-D, L or stereocomplex polylactic (sc-PLA) acid and mixtures thereof. In embodiment the PLA may have a molecular weight (Mw) of from about 750 g/mol to about 5,000,000 g/mol, or from 5000 g/mol to 1 000 000 g/mol, or from 10,000 g/mol to 500,000 g/mol, or from 30,000 g/mol to 500 000 g/mol. The polydispersity of these polymers might be between 1.5 to 5.

The inherent viscosity of PLA that may be used, as measured in Hexafluoro-2-propanol at 30 deg C., with 0.1% polymer concentration may be from about 1.0 dl/g to 2.6 about dl/g, or from 1.3 dl/g to 2.3 dl/g.

In embodiments, the PLA may have a glass transition temperature (Tg) above about 20° C., or above 25° C., or above 30° C., or from 35° C. to 55° C. In embodiments, the PLA may have a melting temperature (Tm) below about 140° C., or about 160° C., or about 180° C. or from about 220° C. to about 230° C.

In some embodiments, the fibers contain silicones. Without wishing to be bound by any theory, it is believe that fibers containing 0.1 to 20 wt %, or 0.1 to 5% of silicones exhibit a higher dispersibility while also having a higher non-bridging capacity.

In embodiments, the fiber, comprising a polyester and silicones may be in the form of a dual component with a shell and a core. In this configuration at least the shell or the core contain a polyester and one of the component or both contain 0.1 to 20 wt % of silicones. The two components may have different degradation rate depending on the conditions.

The silicone may be present in the fiber in 0.1 to 20 wt %, or 0.1 to 5 wt %, or 0.1 to 3 wt % or 0.5 to 3 wt %. The fiber containing silicones in the present context shall be understood as polymeric fibers, such a polyester, containing a dispersed phase of silicones. This type of fibers may be obtained for example by mixing melting silicones and melted polymers and then extruding the mixture so that the repartition of silicones may be relatively homogeneous. In embodiments the fibers may be obtained by extrusion from pellets of thermoplastic material containing silicones and PLA.

Silicones in the present context may be understood broadly. The silicones as used in the disclosure are solid at room temperature (25° C.). As mentioned previously, the polymer part and the silicones part may typically be mixed as solid at room temperature before melt so that a homogeneous distribution can be obtained throughout the polymer fiber. In embodiments, the silicone is obtained from silicate, for example silica, or fumed silica; when fumed silica is used, it may have a specific surface area (BET) above about 30 m$^2$/g, or above 50 m$^2$/g. In embodiments, the silicone used is prepared from polymer containing siloxane and organic radicals.

The silicone polymers may be cyclic polysiloxanes, linear polysiloxanes, branched polysiloxanes, crosslinked polysiloxanes and mixtures thereof.

Linear polysiloxanes that may be used are the ones of the formula:

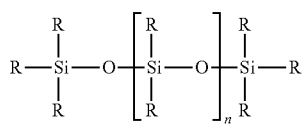

Wherein R may be C1-C10 hydrocarbon radical, or alkyl, aryl, etc.

In embodiments cyclic polysiloxanes of the following formula may be used:

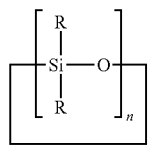

Wherein R may be C1-C10 hydrocarbon radical, or alkyl, aryl, etc.

n may be an integer of at least 4, 5 or 6.

In embodiments, branched polysiloxane of the following formula may be used:

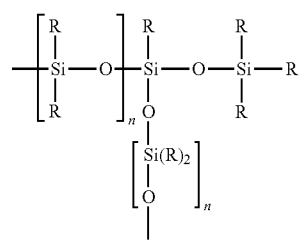

Wherein R may be C1-C10 hydrocarbon radical, or alkyl, aryl, etc.

n may be the same or different and for a number from 10 to 10,000.

In embodiments, cross-linked polysiloxanes of the following formula may be used:

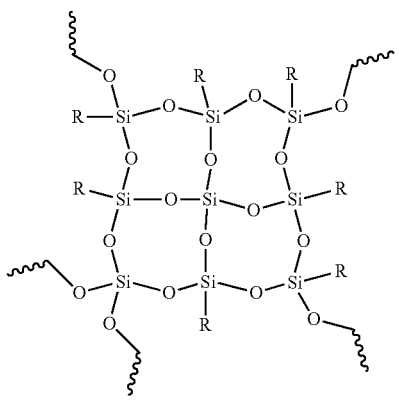

Wherein R may be C1-C10 hydrocarbon radical, or alkyl, aryl, etc.

In embodiments, the silicone used is a linear silicone. In embodiment, such linear silicone has a molecular weight (Mw) of at least about 100,000 g/mol, or at least 150,000 g/mol, or at least 200,000 g/mol and up to about 900,000 g/mol, or up to 700,000 g/mol, or up to 650,000 g/mol, or up to 600,000 g/mol. In embodiments, the high molecular weight, non-crosslinked, linear silicone polymers used may have, at 25° C., a density between 0.76 and 1.07 g/cm$^3$, or from 0.9 to 1.07 g/cm$^3$, or from 0.95 to 1.07 g/cm$^3$.

The fibers containing silicone provide better proppant transport and reduced settling with reduced water requirements (higher proppant loading), reduced proppant requirements (better proppant placement) and reduced power requirements (better dispersibility). The fibers may increase proppant transport in viscosified fluid. The fibers may be degradable after placement in the formation. The fibers can be used in hybrid treatments such as heterogeneous proppant placement and/or pulsed proppant and/or fiber pumping operation modes.

In further embodiments, the channelant may comprise a fiber with a length from 1 to 20 mm, or more specifically from 3 to 12 mm, or 3 to 8 mm, or even 3 to 6 mm, and a diameter of from 1 to 50 microns, or, more specifically from 3 to 40 microns, or 3 to 20 microns, or even 3 to 7 microns. All values and subranges from 1 to 20 mm are included and disclosed herein. For example, the fiber agglomerant length may be from a lower limit of 1, 3, 5, 7, 9, or 19 mm to any higher upper limit of 2, 4, 6, 8, 10, or 20 mm.

In embodiments of the present disclosure a mixtures of fibers containing silicones may be mixed with other fibers of several types that can be used wherein fiber types may differ by material composition and/or fiber shapes.

In further embodiments, the channelant may be fiber selected from the group consisting of polylactic acid (PLA), polyester, or a combination thereof.

In further embodiments, the fluid may comprise a fiber with a length from 0.001 to 1 mm and a diameter of from 50 nanometers (nm) to 10 microns. All individual values from 0.001 to 1 mm are disclosed and included herein. For example, the fiber length may be from a lower limit of 0.001, 0.01, 0.1 or 0.9 mm to any higher upper limit of 0.009, 0.07, 0.5 or 1 mm. All individual values from 50 nanometers to 10 microns are included and disclosed herein. For example, the fiber diameter may range from a lower limit of 50, 60, 70, 80, 90, 100, or 500 nanometers to an upper limit of 500 nanometers, 1 micron, or 10 microns.

In some embodiments, the channelant may further comprise an expandable material, such as, for example, swellable elastomers, temperature expandable particles, Examples of oil swellable elastomers include butadiene based polymers and copolymers such as styrene butadiene rubber (SBR), styrene butadiene block copolymers, styrene isoprene copolymer, acrylate elastomers, neoprene elastomers, nitrile elastomers, vinyl acetate copolymers and blends of EVA, and polyurethane elastomers. Examples of water and brine swellable elastomers include maleic acid grafted styrene butadiene elastomers and acrylic acid grafted elastomers. Examples of temperature expandable particles include metals and gas filled particles that expand more when the particles are heated relative to silica sand. In some embodiments, the expandable metals can include a metal oxide of Ca, Mn, Ni, Fe, etc. that reacts with the water to generate a metal hydroxide which has a lower density than the metal oxide, i.e., the metal hydroxide occupies more volume than the metal oxide thereby increasing the volume occupied by the particle. Further examples of swellable inorganic materials can be found in U.S. Application Publication Number US 20110098202, which is hereby incorporated by reference in its entirety. An example for gas filled material is EXPANCEL™ microspheres that are manufactured by and commercially available from Akzo Nobel of Chicago, Ill. These microspheres contain a polymer shell with gas entrapped inside. When these microspheres are heated the gas inside the shell expands and increases the size of the particle. The diameter of the particle can increase 4 times which could result in a volume increase by a factor of 64.

In some embodiments the channelant may further comprise gel bodies such as balls or blobs made with a viscosifier, such as for example, a water soluble polymer such as polysaccharide like hydroxyethylcellulose (HEC) and/or guar, copolymers of polyacrylamide and their derivatives, and the like, e.g., at a concentration of 1.2 to 24 g/L (10 to 200 ppt where "ppt" is pounds per 1000 gallons of fluid), or a viscoelastic surfactant (VES). The polymer in some embodiments may be crosslinked with a crosslinker such as metal, e.g., calcium or borate. The gel bodies may further optionally comprise fibers and/or particulates dispersed in an internal phase. The gel bodies may be made from the same or different polymer and/or crosslinker as the continuous crosslinked polymer phase, but may have a different viscoelastic characteristic or morphology.

In some embodiments, a system to produce reservoir fluids comprises the wellbore and the fracture resulting from any of the fracturing methods disclosed herein.

The following discussion is based on specific examples according to some embodiments wherein the first particulate comprises proppant and the agglomerant or anchor, where present, comprises fiber. In some specific embodiments illustrated below, the wellbore is oriented horizontally and the fracture is generally vertical, however, the disclosure herein is not limited to this specific configuration.

As used herein, the terms "treatment fluid" or "wellbore treatment fluid" are inclusive of "fracturing fluid" or "treatment slurry" and should be understood broadly. These may be or include a liquid, a solid, and combinations thereof, as will be appreciated by those skilled in the art. A treatment fluid may take the form of a solution, an emulsion, slurry, or any other form as will be appreciated by those skilled in the art.

As used herein, "slurry" refers to an optionally flowable mixture of particles dispersed in a fluid carrier. The terms "flowable" or "pumpable" or "mixable" are used interchangeably herein and refer to a fluid or slurry that has either a yield stress or low-shear (5.11 s$^{-1}$) viscosity above 50 mPa-s, or above 100 mPa-s at a shear rate 170 s$^{-1}$, where yield stress, low-shear viscosity and dynamic apparent viscosity are measured at a temperature of 25° C. unless another temperature is specified explicitly or in context of use.

"Viscosity" as used herein unless otherwise indicated refers to the apparent dynamic viscosity of a fluid at a temperature of 25° C. and shear rate of 170 s$^{-1}$.

"Treatment fluid" or "fluid" (in context) refers to the entire treatment fluid, including any proppant, subproppant particles, liquid, etc. "Whole fluid," "total fluid" and "base fluid" are used herein to refer to the fluid phase plus any subproppant particles dispersed therein, but exclusive of proppant particles. "Carrier," "fluid phase" or "liquid phase" refer to the fluid or liquid that is present, which may comprise a continuous phase and optionally one or more discontinuous liquid fluid phases dispersed in the continuous phase, including any solutes, thickeners or colloidal particles only, exclusive of other solid phase particles; reference to "water" in the slurry refers only to water and excludes any gas, liquid or solid particles, solutes, thickeners, colloidal particles, etc.; reference to "aqueous phase" refers to a carrier phase comprised predominantly of water, which may be a continuous or dispersed phase. As used herein the terms "liquid" or "liquid phase" encompasses both liquids per se and supercritical fluids, including any solutes dissolved therein.

The term "dispersion" means a mixture of one substance dispersed in another substance, and may include colloidal or non-colloidal systems. As used herein, "emulsion" generally means any system with one liquid phase dispersed in another immiscible liquid phase, and may apply to oil-in-water and water-in-oil emulsions. Invert emulsions refer to any water-in-oil emulsion in which oil is the continuous or external phase and water is the dispersed or internal phase.

As used herein unless otherwise specified, as described in further detail herein, particle size and particle size distribution (PSD) mode refer to the median volume averaged size. The median size used herein may be any value understood in the art, including for example and without limitation a diameter of roughly spherical particulates. In an embodiment, the median size may be a characteristic dimension, which may be a dimension considered most descriptive of the particles for specifying a size distribution range.

As used herein, a "water soluble polymer" refers to a polymer which has a water solubility of at least 5 wt % (0.5 g polymer in 9.5 g water) at 25° C.

The measurement or determination of the viscosity of the liquid phase (as opposed to the treatment fluid or base fluid) may be based on a direct measurement of the solids-free liquid, or a calculation or correlation based on a measurement(s) of the characteristics or properties of the liquid containing the solids, or a measurement of the solids-containing liquid using a technique where the determination of viscosity is not affected by the presence of the solids. As used herein, solids-free for the purposes of determining the viscosity of the liquid phase means in the absence of non-colloidal particles larger than 1 micron such that the particles do not affect the viscosity determination, but in the presence of any submicron or colloidal particles that may be present to thicken and/or form a gel with the liquid, i.e., in the presence of ultrafine particles that can function as a thickening agent.

In some embodiments, the treatment fluid may include a continuous fluid phase, also referred to as an external phase, and a discontinuous phase(s), also referred to as an internal phase(s), which may be a fluid in the case of an emulsion, or which may be a solid in the case of a slurry. The continuous fluid phase, also referred to herein as the carrier fluid or comprising the carrier fluid, may be any matter that is substantially continuous under a given condition. Examples of the continuous fluid phase include, but are not limited to, water, hydrocarbon, etc., which may include solutes, e.g. the fluid phase may be a brine, and/or may include a brine or other solution(s). In the present disclosure, the continuous phase includes a viscosifying and/or yield point agent and/or a portion of the total amount of viscosifying and/or yield point agent present. Some non-limiting examples of the fluid phase(s) include hydratable gels and mixtures of hydratable gels (e.g. gels containing polysaccharides such as guars and their derivatives, xanthan and diutan and their derivatives, hydratable cellulose derivatives such as hydroxyethylcellulose, carboxymethylcellulose and others, polyvinyl alcohol and its derivatives, other hydratable polymers, colloids, etc.), a cross-linked hydratable gel, a viscosified acid (e.g. gel-based), an emulsified acid (e.g. oil outer phase), a viscoelastic surfactant (VES) viscosified fluid, and an oil-based fluid including a gelled, or otherwise viscosified oil.

The discontinuous phase if present in the treatment fluid may be any particles (including fluid droplets) that are suspended or otherwise dispersed in the continuous phase in a disjointed manner. In this respect, the discontinuous phase can also be referred to, collectively, as "particle" or "particulate" which may be used interchangeably. As used herein, the term "particle" should be construed broadly. For example, in some embodiments, the particle(s) of the current application are solid such as proppant, sands, ceramics, crystals, salts, etc.; however, in some other embodiments, the particle(s) can be liquid, emulsified droplets, etc. Moreover, in some embodiments, the particle(s) of the current application are substantially stable and do not change shape or form over an extended period of time, temperature, or pressure; in some other embodiments, the particle(s) of the current application are degradable, expandable, swellable, dissolvable, deformable, meltable, sublimeable, or otherwise capable of being changed in shape, state, or structure.

In an embodiment, the particle(s) is substantially round and spherical. In an embodiment, the particle(s) is not substantially spherical and/or round, e.g., it can have varying degrees of sphericity and roundness, according to the API RP-60 sphericity and roundness index. For example, the particle(s) used as anchorants or otherwise may have an aspect ratio of more than 2, 3, 4, 5 or 6. Examples of such non-spherical particles include, but are not limited to, fibers, flocs, flakes, discs, rods, stars, etc. All such variations should be considered within the scope of the current application.

Introducing high-aspect ratio particles into the treatment fluid, e.g., particles having an aspect ratio of at least 6, represents additional or alternative embodiments for stabilizing the treatment fluid and inhibiting settling during proppant placement, which can be removed, for example by dissolution or degradation into soluble degradation products. Examples of such non-spherical particles include, but are not limited to, fibers, flocs, flakes, discs, rods, stars, etc., as described in, for example, U.S. Pat. No. 7,275,596, US20080196896, which are hereby incorporated herein by reference. In an embodiment, introducing ciliated or coated proppant into the treatment fluid may also stabilize or help stabilize the treatment fluid or regions thereof. Proppant or other particles coated with a hydrophilic polymer can make the particles behave like larger particles and/or more tacky particles in an aqueous medium. The hydrophilic coating on a molecular scale may resemble ciliates, i.e., proppant particles to which hairlike projections have been attached to or formed on the surfaces thereof. Herein, hydrophilically coated proppant particles are referred to as "ciliated or coated proppant." Hydrophilically coated proppants and methods of producing them are described, for example, in WO 2011-050046, U.S. Pat. Nos. 5,905,468, 8,227,026 and 8,234,072, which are hereby incorporated herein by reference.

In an embodiment, the particles may be multimodal. As used herein multimodal refers to a plurality of particle sizes or modes which each has a distinct size or particle size distribution, e.g., proppant and fines. As used herein, the terms distinct particle sizes, distinct particle size distribution, or multi-modes or multimodal, mean that each of the plurality of particles has a unique volume-averaged particle size distribution (PSD) mode. That is, statistically, the particle size distributions of different particles appear as distinct peaks (or "modes") in a continuous probability distribution function. For example, a mixture of two particles having normal distribution of particle sizes with similar variability is considered a bimodal particle mixture if their respective means differ by more than the sum of their respective standard deviations, and/or if their respective means differ by a statistically significant amount. In an embodiment, the particles contain a bimodal mixture of two particles; in an embodiment, the particles contain a trimodal mixture of three particles; in an embodiment, the particles contain a tetramodal mixture of four particles; in an embodiment, the particles contain a pentamodal mixture of five particles, and so on. Representative references disclosing multimodal particle mixtures include U.S. Pat. Nos. 5,518,996, 7,784,541, 7,789,146, 8,008,234, 8,119,574, 8,210,249, US 2010/0300688, US 2012/0000641, US 2012/0138296, US 2012/0132421, US 2012/0111563, WO 2012/054456, US 2012/0305245, US 2012/0305254, US 2012/0132421, WO2013085412 and US 20130233542, each of which are hereby incorporated herein by reference.

"Solids" and "solids volume" refer to all solids present in the slurry, including proppant and subproppant particles, including particulate thickeners such as colloids and submicron particles. "Solids-free" and similar terms generally exclude proppant and subproppant particles, except particulate thickeners such as colloids for the purposes of determining the viscosity of a "solids-free" fluid.

"Proppant" refers to particulates that are used in well work-overs and treatments, such as hydraulic fracturing operations, to hold fractures open following the treatment. In some embodiments, the proppant may be of a particle size mode or modes in the slurry having a weight average mean particle size greater than or equal to about 100 microns, e.g., 140 mesh particles correspond to a size of 105 microns. In further embodiments, the proppant may comprise particles or aggregates made from particles with size from 0.001 to 1 mm. All individual values from 0.001 to 1 mm are disclosed and included herein. For example, the solid particulate size may be from a lower limit of 0.001, 0.01, 0.1 or 0.9 mm to an upper limit of 0.009, 0.07, 0.5 or 1 mm. Here particle size is defined is the largest dimension of the grain of said particle.

"Gravel" refers to particles used in gravel packing, and the term is synonymous with proppant as used herein. "Sub-proppant" or "subproppant" refers to particles or particle size or mode (including colloidal and submicron particles) having a smaller size than the proppant mode(s); references to "proppant" exclude subproppant particles and vice versa. In an embodiment, the sub-proppant mode or modes each have a weight average mean particle size less than or equal to about one-half of the weight average mean particle size of a smallest one of the proppant modes, e.g., a suspensive/stabilizing mode.

The proppant, when present, can be naturally occurring materials, such as sand grains. The proppant, when present, can also be man-made or specially engineered, such as coated (including resin-coated) sand, modulus of various nuts, high-strength ceramic materials like sintered bauxite, etc. In some embodiments, the proppant of the current application, when present, has a density greater than 2.45 g/mL, e.g., 2.5-2.8 g/mL, such as sand, ceramic, sintered bauxite or resin coated proppant. In some embodiments, the proppant of the current application, when present, has a density greater than or equal to 2.8 g/mL, and/or the treatment fluid may comprise an apparent specific gravity less than 1.5, less than 1.4, less than 1.3, less than 1.2, less than 1.1, or less than 1.05, less than 1, or less than 0.95, for example. In some embodiments a relatively large density difference between the proppant and carrier fluid may enhance proppant settling during the clustering phase, for example.

In some embodiments, the proppant of the current application, when present, has a density less than or equal to 2.45 g/mL, such as light/ultralight proppant from various manufacturers, e.g., hollow proppant. In some embodiments, the treatment fluid comprises an apparent specific gravity greater than 1.3, greater than 1.4, greater than 1.5, greater than 1.6, greater than 1.7, greater than 1.8, greater than 1.9, greater than 2, greater than 2.1, greater than 2.2, greater than 2.3, greater than 2.4, greater than 2.5, greater than 2.6, greater than 2.7, greater than 2.8, greater than 2.9, or greater than 3. In some embodiments where the proppant may be buoyant, i.e., having a specific gravity less than that of the carrier fluid, the term "settling" shall also be inclusive of upward settling or floating.

"Stable" or "stabilized" or similar terms refer to a concentrated blend slurry (CBS) wherein gravitational settling of the particles is inhibited such that no or minimal free liquid is formed, and/or there is no or minimal rheological variation among strata at different depths in the CBS, and/or the slurry may generally be regarded as stable over the duration of expected CBS storage and use conditions, e.g., a CBS that passes a stability test or an equivalent thereof. In an embodiment, stability can be evaluated following different settling conditions, such as for example static under gravity alone, or dynamic under a vibratory influence, or dynamic-static conditions employing at least one dynamic settling condition followed and/or preceded by at least one static settling condition.

The static settling test conditions can include gravity settling for a specified period, e.g., 24 hours, 48 hours, 72 hours, or the like, which are generally referred to with the respective shorthand notation "24h-static", "48h-static" or "72h static". Dynamic settling test conditions generally indicate the vibratory frequency and duration, e.g., 4h@15 Hz (4 hours at 15 Hz), 8h@5 Hz (8 hours at 5 Hz), or the like. Dynamic settling test conditions are at a vibratory amplitude of 1 mm vertical displacement unless otherwise indicated. Dynamic-static settling test conditions will indicate the settling history preceding analysis including the total duration of vibration and the final period of static conditions, e.g., 4h@15 Hz/20h-static refers to 4 hours vibration followed by 20 hours static, or 8h@15 Hz/10d-static refers to 8 hours total vibration, e.g., 4 hours vibration followed by 20 hours static followed by 4 hours vibration, followed by 10 days of static conditions. In the absence of a contrary indication, the designation "8h@15 Hz/10d-static" refers to the test conditions of 4 hours vibration, followed by 20 hours static followed by 4 hours vibration, followed by 10 days of static conditions. In the absence of specified settling conditions, the settling condition is 72 hours static. The stability settling and test conditions are at 25° C. unless otherwise specified.

As used herein, a concentrated blend slurry (CBS) may meet at least one of the following conditions:
(1) the slurry has a low-shear viscosity equal to or greater than 1 Pa-s (5.11 s$^{-1}$, 25° C.);
(2) the slurry has a Herschel-Bulkley (including Bingham plastic) yield stress (as determined in the manner described herein) equal to or greater than 1 Pa; or
(3) the largest particle mode in the slurry has a static settling rate less than 0.01 mm/hr; or
(4) the depth of any free fluid at the end of a 72-hour static settling test condition or an 8h@15 Hz/10d-static dynamic settling test condition (4 hours vibration followed by 20 hours static followed by 4 hours vibration followed finally by 10 days of static conditions) is no more than 2% of total depth; or
(5) the apparent dynamic viscosity (25° C., 170 s$^{-1}$) across column strata after the 72-hour static settling test condition or the 8h@15 Hz/10d-static dynamic settling test condition is no more than +/−20% of the initial dynamic viscosity; or
(6) the slurry solids volume fraction (SVF) across the column strata below any free water layer after the 72-hour static settling test condition or the 8h@15 Hz/10d-static dynamic settling test condition is no more than 5% greater than the initial SVF; or
(7) the density across the column strata below any free water layer after the 72-hour static settling test condition or the 8h@15 Hz/10d-static dynamic settling test condition is no more than 1% of the initial density.

In some embodiments, the concentrated blend slurry comprises at least one of the following stability indicia: (1) an SVF of at least 0.4 up to SVF=PVF; (2) a low-shear viscosity of at least 1 Pa-s (5.11 s$^{-1}$, 25° C.); (3) a yield stress (as determined herein) of at least 1 Pa; (4) an apparent viscosity of at least 50 mPa-s (170 s$^{-1}$, 25° C.); (5) a multimodal solids phase; (6) a solids phase having a PVF greater than 0.7; (7) a viscosifier selected from viscoelastic surfactants, in an amount ranging from 0.01 up to 7.2 g/L (60 ppt), and hydratable gelling agents in an amount ranging from 0.01 up to 4.8 g/L (40 ppt) based on the volume of fluid phase; (8) colloidal particles; (9) a particle-fluid density delta less than 1.6 g/mL, (e.g., particles having a specific gravity less than 2.65 g/mL, carrier fluid having a density greater than 1.05 g/mL or a combination thereof); (10) particles having an aspect ratio of at least 6; (11) ciliated or coated proppant; and (12) combinations thereof.

In an embodiment, the concentrated blend slurry is formed (stabilized) by at least one of the following slurry stabilization operations: (1) introducing sufficient particles into the slurry or treatment fluid to increase the SVF of the treatment fluid to at least 0.4; (2) increasing a low-shear viscosity of the slurry or treatment fluid to at least 1 Pa-s (5.11 s$^{-1}$, 25° C.); (3) increasing a yield stress of the slurry or treatment fluid to at least 1 Pa; (4) increasing apparent viscosity of the slurry or treatment fluid to at least 50 mPa-s (170 s$^{-1}$, 25° C.); (5) introducing a multimodal solids phase into the slurry or treatment fluid; (6) introducing a solids phase having a PVF greater than 0.7 into the slurry or treatment fluid; (7) introducing into the slurry or treatment fluid a viscosifier selected from viscoelastic surfactants, e.g., in an amount ranging from 0.01 up to 7.2 g/L (60 ppt), and hydratable gelling agents, e.g., in an amount ranging from 0.01 up to 4.8 g/L (40 ppt) based on the volume of fluid phase; (8) introducing colloidal particles into the slurry or treatment fluid; (9) reducing a particle-fluid density delta to less than 1.6 g/mL (e.g., introducing particles having a specific gravity less than 2.65 g/mL, carrier fluid having a density greater than 1.05 g/mL or a combination thereof); (10) introducing particles into the slurry or treatment fluid having an aspect ratio of at least 6; (11) introducing ciliated or coated proppant into slurry or treatment fluid; and (12) combinations thereof. The slurry stabilization operations may be separate or concurrent, e.g., introducing a single viscosifier may also increase low-shear viscosity, yield stress, apparent viscosity, etc., or alternatively or additionally with respect to a viscosifier, separate agents may be added to increase low-shear viscosity, yield stress and/or apparent viscosity.

Increasing carrier fluid viscosity in a Newtonian fluid also proportionally increases the resistance of the carrier fluid motion. In some embodiments, the carrier fluid has a lower limit of apparent dynamic viscosity, determined at $170\ s^{-1}$ and 25° C., of at least about 10 mPa-s, or at least about 25 mPa-s, or at least about 50 mPa-s, or at least about 75 mPa-s, or at least about 100 mPa-s, or at least about 150 mPa-s, or at least about 300 mPa-s, or at least about 500 mPa-s. A disadvantage of increasing the viscosity is that as the viscosity increases, the friction pressure for pumping the slurry generally increases as well. In some embodiments, the fluid carrier has an upper limit of apparent dynamic viscosity, determined at $170\ s^{-1}$ and 25° C., of less than about 1000 mPa-s, or less than about 500 mPa-s, or less than about 300 mPa-s, or less than about 150 mPa-s, or less than about 100 mPa-s, or less than about 50 mPa-s. In an embodiment, the fluid phase viscosity ranges from any lower limit to any higher upper limit.

In some embodiments, an agent may both viscosify and impart yield stress characteristics, and in further embodiments may also function as a friction reducer to reduce friction pressure losses in pumping the treatment fluid. In an embodiment, the liquid phase is essentially free of viscosifier or comprises a viscosifier in an amount ranging from 0.01 up to 12 g/L (0.08-100 ppt) of the fluid phase. The viscosifier can be a viscoelastic surfactant (VES) or a hydratable gelling agent such as a polysaccharide, which may be crosslinked. When using viscosifiers and/or yield stress fluids, proppant settling in some embodiments may be triggered by breaking the fluid using a breaker(s). In some embodiments, the slurry is stabilized for storage and/or pumping or other use at the surface conditions and proppant transport and placement, and settlement triggering is achieved downhole at a later time prior to fracture closure, which may be at a higher temperature, e.g., for some formations, the temperature difference between surface and downhole can be significant and useful for triggering degradation of the viscosifier, any stabilizing particles (e.g., subproppant particles) if present, a yield stress agent or characteristic, and/or a activation of a breaker. Thus in some embodiments, breakers that are either temperature sensitive or time sensitive, either through delayed action breakers or delay in mixing the breaker into the slurry to initiate destabilization of the slurry and/or proppant settling, can be useful.

In embodiments, the fluid may include leakoff control agents, such as, for example, latex dispersions, water soluble polymers, submicron particulates, particulates with an aspect ratio higher than 1, or higher than 6, combinations thereof and the like, such as, for example, crosslinked polyvinyl alcohol microgel. The fluid loss agent can be, for example, a latex dispersion of polyvinylidene chloride, polyvinyl acetate, polystyrene-co-butadiene; a water soluble polymer such as hydroxyethylcellulose (HEC), guar, copolymers of polyacrylamide and their derivatives; particulate fluid loss control agents in the size range of 30 nm to 1 micron, such as γ-alumina, colloidal silica, CaCO3, SiO2, bentonite etc.; particulates with different shapes such as glass fibers, flocs, flakes, films; and any combination thereof or the like. Fluid loss agents can if desired also include or be used in combination with acrylamido-methyl-propane sulfonate polymer (AMPS). In an embodiment, the leak-off control agent comprises a reactive solid, e.g., a hydrolyzable material such as PGA, PLA or the like; or it can include a soluble or solubilizable material such as a wax, an oil-soluble resin, or another material soluble in hydrocarbons, or calcium carbonate or another material soluble at low pH; and so on. In an embodiment, the leak-off control agent comprises a reactive solid selected from ground quartz, oil soluble resin, degradable rock salt, clay, zeolite or the like. In other embodiments, the leak-off control agent comprises one or more of magnesium hydroxide, magnesium carbonate, magnesium calcium carbonate, calcium carbonate, aluminum hydroxide, calcium oxalate, calcium phosphate, aluminum metaphosphate, sodium zinc potassium polyphosphate glass, and sodium calcium magnesium polyphosphate glass, or the like. The treatment fluid may also contain colloidal particles, such as, for example, colloidal silica, which may function as a loss control agent, gellant and/or thickener.

In embodiments, the proppant-containing treatment fluid may comprise from 0.06 or 0.12 g of proppant per mL of treatment fluid (corresponding to 0.5 or 1 ppa) up to 1.2 or 1.8 g/mL (corresponding to 10 or 15 ppa). In some embodiments, the proppant-laden treatment fluid may have a relatively low proppant loading in earlier-injected fracturing fluid and a relatively higher proppant loading in later-injected fracturing fluid, which may correspond to a relatively narrower fracture width adjacent a tip of the fracture and a relatively wider fracture width adjacent the wellbore. For example, the proppant loading may initially begin at 0.48 g/mL (4 ppa) and be ramped up to 0.6 g/mL (6 ppa) at the end.

In embodiments, the treatment fluid is pumped as a continuous crosslinked fluid without pulses.

EXAMPLE

The fibers used in the following examples were polylactic acid fibers containing 0.9% silicones that were obtained from Trevira GmbH (Germany). The NF1 fibers were straight (uncrimped), whereas the SF1 fibers were crimped (2.5 crimps/cm). NF1 was not containing silicones (OPS) whereas SF1 contained 0.9 wt % of silicones.

TABLE 1

| Fiber ID | OPS, wt % | Diameter, micron | Length, mm | Morphology |
|---|---|---|---|---|
| NF1 | 0 | 12.4 | 6 | Uncrimped |
| SF1 | 0.9 | 7.9 | 3 | Crimped |

Example 1: Fiber Dispersibility

Without wishing to be bound by any theory, it is believed that fiber dispersibility depends inter alia on viscosity of the surrounding fluid and mixing conditions such as time and shear rate. Fibers are not dispersible directly in crosslinked fluid due to its high viscosity. Therefore, in the industry, fiber material is added to linear gel and should disperse as fast as possible before fluid crosslinking. It has been reported previously that short crosslink delay and poor fiber dispersion may cause excessive failure of high pressure pump valves during fracturing treatment and hence should be eliminated.

3 experiments were conducted were fibers were introduced in a linear gel fluid before crosslinking. The gel was made of 3.6 g/L of guar in water, each batch were supplemented with 3.6 g/L of fibers.

Batch A: NF1 fibers were added 1 minute before crosslinking.

Batch B: NF1 fibers were added 10 minute before crosslinking.

Batch C: SF1 fibers were added 1 minute before crosslinking.

Once the fiber resided the required period of time, the fluid was crosslinked using 2.5 mL/L of boric acid crosslinker.

After crosslinking, the batches were placed into narrow glass slot of 4 mm width. The slot was put into digital scanner and the scan images were taken. Conventional fiber NF1 needs more time before crosslinking for proper dispersion of fiber bundles since batch A was containing a high amount of clump. Batch B was slightly more homogeneous but still containing some amount of undispersed fibers. Batch C, containing the silicones modified fiber demonstrated excellent dispersion after short time before crosslinking.

Example 2: Fiber Bridging

Figure 4A:
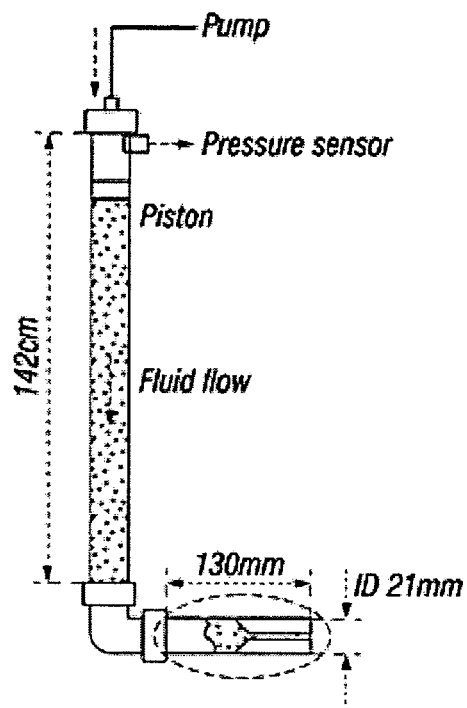
FIG. 4A schematically illustrates a bridging test apparatus according to embodiments.
Figure 4B:
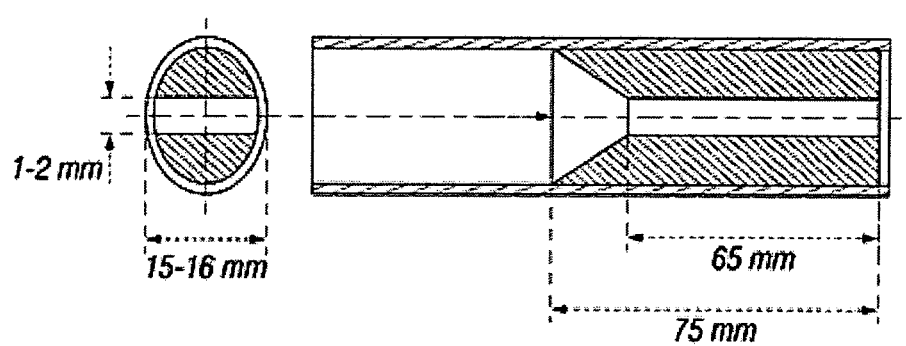
FIG. 4B schematically illustrates an enlarged detail of the slot design in the apparatus of FIG. 4A.

The bridging screen test apparatus used is seen in FIGS. 4A and 4B. The fluid being tested was pumped through the apparatus at a flow rate of 100-300 mL/min for a period of at least 1 minute (at the end of the time period the total volume of fluid pumped was 500 mL). Formation of a fiber plug in the slot (1.15 mm) was indicated by a pressure rise. Bridging tests using the test apparatus of FIGS. 4A-4B were conducted using 0.48 kg/L ceramic proppant CARBO-PROP™ 40/70 mesh obtained from CARBO Ceramics™ (Houston, Tex., USA). The carrier fluid was made of 3.6 g/L of guar (high-yielding dry guar available from Economy Polymers and Chemicals) in water, to which 3.6 g/L of fibers were added and dispersed with Cole-Parmer™ overhead mixer for 3 minutes. Then 0.48 kg/L proppant were added to the mixture of fiber in carrier fluid and dispersed in that mixture for another 3 minutes. Then 2.5 ml/L of boric acid crosslinker was added to the slurry. In 30 seconds once crosslinking occurred the mixer was stopped and the resulted slurry was placed into bridging setup.

The fluid was recorded as negative for bridge formation if no plug was formed.

TABLE 2

| Flow rate, mL/min | Linear velocity, cm/sec | NF1 | SF1 |
|---|---|---|---|
| 100 | 9.1 | Bridging | No bridging |
| 300 | 27.2 | Bridging | No bridging |

Silicone modified fiber SF1 did not bridge at fluid velocity as low as 9.1 cm/sec, whereas conventional fiber NF1 bridges at flow rate even 3 times higher, i.e. 27.2 cm/sec.

Example 3: Proppant Settling Test

The fluid as in example 2 was used to measure the proppant settling at 176° F.

This settling inhibition may be evidenced, in some embodiments, for example, in a static proppant settling test for 120. The proppant settling test in some embodiments involves placing the fluid in a container such as a graduated cylinder or transparent slot and recording the upper level of dispersed proppant in the fluid. The upper level of dispersed proppant is recorded at periodic time intervals while maintaining settling conditions. The proppant settling fraction is calculated as:

$$\text{Proppant settling} = \frac{[\text{initial proppant level } (t=0)] - [\text{upper proppant level at time } n]}{[\text{initial proppant level } (t=0)] - [\text{final proppant level } (t=\infty)]}$$

The fiber inhibits proppant settling if the proppant settling fraction for the fluid containing the proppant and fiber has a lower proppant settling fraction than the same fluid without the fiber and with proppant only. In some embodiments, the proppant settling fraction of the treatment fluid in the static proppant settling test after 120 minutes is less than 50%, e.g., less than 40%.

Figure 5:
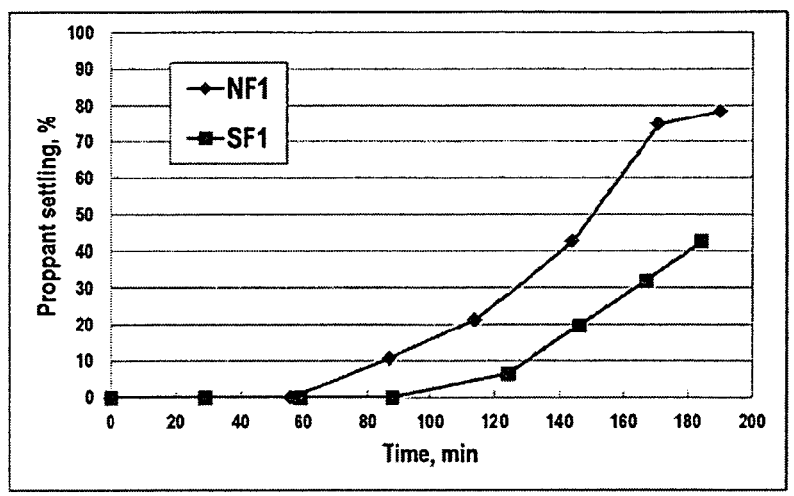
FIG. 5 illustrates the result of a proppant settling measurement.

The results of this test appear on FIG. 5. As apparent, in the same fluid and equal concentration of fibers, the SF1 fibers enable a lower proppant settling than the NF1.

While the embodiments have been illustrated and described in detail in the drawings and foregoing description, the same is to be considered as illustrative and not restrictive in character, it being understood that only some embodiments have been shown and described and that all changes and modifications that come within the spirit of the embodiments are desired to be protected. It should be understood that while the use of words such as ideally, desirably, preferable, preferably, preferred, more preferred or exemplary utilized in the description above indicate that the feature so described may be more desirable or characteristic, nonetheless may not be necessary and embodiments lacking the same may be contemplated as within the scope of the disclosure, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

We claim:

1. A method to treat a subterranean formation penetrated by a wellbore, comprising:
   injecting a treatment fluid into the subterranean formation to form a hydraulic fracture system, wherein the treatment fluid comprises:
   a viscosified carrier fluid having a viscosity above 50 mPa-s at a shear rate of 170 s-1 and a temperature of 25° C.;
   proppant dispersed in the carrier fluid; and a fiber comprising polylactic acid and non-crosslinked silicones dispersed in the carrier fluid.

2. The method of claim 1, further comprising injecting a pre-pad, pad, tail or flush stage or a combination thereof.

3. The method of claim 1, wherein the treatment fluid comprises from 0.06 to 1.8 kg/L of the proppant based on the total volume of the carrier fluid (from 0.5 to 15 ppa, pounds proppant added per gallon of carrier fluid).

4. The method of claim 1, wherein the treatment fluid comprises fibers at a concentration below 4.8 g/L of the fibers based on the total volume of the carrier fluid (less than 40 ppt).

5. A method of placing a proppant pack into a fracture formed in a subterranean formation, the method comprising:
   injecting a treatment fluid comprising proppant and a fiber comprising polylactic acid and non-crosslinked silicones in a linear gel;
   allowing dispersion of the fiber in the linear gel before crosslinking of the treatment fluid;
   placing the proppant in the fracture in a plurality of proppant clusters forming pillars spaced apart; and,
   removing the fiber to form open channels around the pillars for fluid flow from the formation through the fracture toward the wellbore;
   wherein the treatment fluid comprises alternating volumes of proppant-rich fluid and proppant-lean fluid.

6. The method of claim 5, wherein the fiber comprises degradable fibers.

7. The method of claim 5, wherein the injection comprises:
   injecting a proppant-lean carrier stage to initiate the fracture; and
   thereafter injecting into the fracture proppant and the fiber.

8. The method of claim 5, wherein the solid proppant-rich substages and the proppant-lean substages in the treatment stage fluid have an overall volumetric ratio from 60:40 to 95:5.

9. A method to treat a subterranean formation penetrated by a wellbore, comprising:
   injecting a treatment fluid, comprising a particulate and at least a fiber comprising polylactic acid and non-crosslinked silicones in a linear gel;
   allowing dispersion of the fiber in the linear gel before crosslinking of the treatment fluid;
   alternatingly injecting solid particulate-rich and solid particulate-lean substages of the treatment fluid stage into the fracture, wherein a volume of each of the solid particulate-rich substages is larger than a respective volume of an adjacent one of the solid particulate-lean substages to form a plurality of solid particulate-rich island regions in the fracture and an interconnected network of open channel regions between the island regions, wherein the particulate-rich substages comprise the fiber;
   channelizing the particulate-rich island regions in situ in the fracture to form particulate clusters within the island regions separated from adjacent particulate clusters by open voids in the island regions;
   reducing pressure in the fracture to close the fracture onto the island regions; and
   hydraulically conducting fluid flow through the open channel regions between the formation and the wellbore.

10. The method of claim 9, wherein the solid particulate-rich substages each comprise alternating pulses injected at different rates.

11. The method of claim 9, wherein the fiber comprises an ester and the method further comprises releasing an acid from the ester.

12. A system to treat a fracture interval of a formation penetrated by a wellbore, comprising:
   a subterranean formation penetrated by a wellbore;
   a treatment fluid stage disposed at least partially in the wellbore, the treatment fluid stage comprising solid particulate-rich and solid particulate-lean substages, wherein a volume of each of the solid particulate-rich substages is equal or larger than a respective volume of an adjacent one of the solid particulate-lean substages to form a plurality of solid particulate-rich island regions in the fracture and an interconnected network of open channel regions between the island regions;
   the solid particulate-rich substages each comprising alternating pulses comprising a substantially uniform distribution of one or more components in the alternate pulses and a heterogeneous distribution between alternate pulses of at least one other component to channelize the particulate-rich island regions in situ in the fracture to form particulate clusters within the island regions separated from adjacent particulate clusters by open voids within the island regions;
   a pump system to inject the treatment fluid stage from the wellbore to the formation at a pressure above fracturing pressure to inject the treatment fluid stage into a fracture in the formation; and
   a shut in system to close the fracture onto the solid particulate-rich island regions wherein at least the particulate-rich substages comprise fibers comprising polylactic acid and non-crosslinked silicones dispersed in a linear gel.

* * * * *